(12) United States Patent  (10) Patent No.: US 8,086,736 B2
Omino et al.  (45) Date of Patent: Dec. 27, 2011

(54) DATA TRANSMISSION/RECEPTION SYSTEM CAPABLE OF TRANSMITTING AND RECEIVING DATA EVEN FROM WITHIN A MOBILE UNIT THAT CANNOT MAINTAIN CONSTANT CONNECTIONS WITH A COMMUNICATION NETWORK

(75) Inventors: Takayuki Omino, Minato-ku (JP); Michio Nishioka, Minato-ku (JP); Satoshi Mineshita, Minato-ku (JP)

(73) Assignee: NEC Corporation, Tokyo (JP)

( * ) Notice: Subject to any disclaimer, the term of this patent is extended or adjusted under 35 U.S.C. 154(b) by 1542 days.

(21) Appl. No.: 11/072,243

(22) Filed: Mar. 7, 2005

(65) Prior Publication Data

US 2005/0203682 A1  Sep. 15, 2005

(30) Foreign Application Priority Data

Mar. 10, 2004 (JP) ................... 2004-067466

(51) Int. Cl.
  G06F 15/16  (2006.01)
  G01C 22/00  (2006.01)
(52) U.S. Cl. .......................... 709/227; 701/24
(58) Field of Classification Search .................. 709/227; 711/111, 117; 701/200, 209, 213, 24; 455/436
  See application file for complete search history.

(56) References Cited

U.S. PATENT DOCUMENTS

| 6,801,927 | B1 * | 10/2004 | Smith et al. ................. 709/202 |
| 2002/0160773 | A1 | 10/2002 | Gresham et al. |
| 2003/0078045 | A1 * | 4/2003 | Norstrom et al. ............. 455/436 |
| 2003/0182431 | A1 * | 9/2003 | Sturniolo et al. ............. 709/227 |
| 2004/0072581 | A1 * | 4/2004 | Tajima et al. ............. 455/456.1 |
| 2007/0038759 | A1 * | 2/2007 | Hanson et al. ................. 709/227 |

FOREIGN PATENT DOCUMENTS

| EP | 0 890 907 A1 | 1/1999 |
| JP | 10-322262 A | 12/1998 |
| JP | 2001-45558 A | 2/2001 |

(Continued)

OTHER PUBLICATIONS

Ott, et al., "Drive-thru Internet: IEEE 802.11b for 'Automobile' Users", INFOCOM 2004. Twenty-Third Annual Joint Conference of the IEEE Computer and Communications Societies, Hong Kong, P.R. China, Mar. 7-11, 2004, pp. 362-373, vol. 1, IEEE, XP010740459.

(Continued)

Primary Examiner — Chirag Patel
(74) Attorney, Agent, or Firm — Sughrue Mion, PLLC (57) ABSTRACT

A data transmission/reception system is capable of transmitting and receiving data even from within a moving vehicle in which a constant connection to a communication network cannot be maintained. A temporary storage server that is established inside the moving vehicle temporarily saves upload data that are received from a user terminal. The temporary storage server is provided with the capability to determine whether a state exists that allows communication with various servers. When in a state that allows communication with the various servers, the temporary storage server transmits the data that it has temporarily saved to various servers by way of a communication network. The temporary storage server further, when requested to download from a user terminal, receives the download data from various servers by way of a communication network when in a state that allows communication with the various servers. The temporary storage server then temporarily saves the download data that have been received.

13 Claims, 8 Drawing Sheets

FOREIGN PATENT DOCUMENTS

| | | |
|---|---|---|
| JP | 2001-22603 A | 8/2001 |
| JP | 2001-222603 A | 8/2001 |
| JP | 2002-186030 A | 6/2002 |
| JP | 2002-190764 A | 7/2002 |
| JP | 2002-217810 A | 8/2002 |
| JP | 2002-232343 A | 8/2002 |
| JP | 2002-236632 A | 8/2002 |
| JP | 2003-169370 A | 6/2003 |
| JP | 2003-284136 A | 10/2003 |
| JP | 2003-345351 A | 12/2003 |
| JP | 2004-13290 A | 1/2004 |
| JP | 2004-38242 A | 2/2004 |
| KR | 2003-0073124 A | 9/2003 |
| WO | WO 95/24685 A1 | 9/1995 |
| WO | WO 01/86836 A2 | 11/2001 |
| WO | WO 02/080487 A2 | 10/2002 |

OTHER PUBLICATIONS

W. Richard Stevens, "TCP/IP Illustrated, vol. 1: The Protocols", 1994, pp. 85, vol. 1, Addison-Wesley, Reading, USA.

* cited by examiner

```
wireless LAN spot virtual file server
         log-in menu log-in name  : [              ]

password     : [              ]
```

DATA TRANSMISSION/RECEPTION SYSTEM CAPABLE OF TRANSMITTING AND RECEIVING DATA EVEN FROM WITHIN A MOBILE UNIT THAT CANNOT MAINTAIN CONSTANT CONNECTIONS WITH A COMMUNICATION NETWORK

BACKGROUND OF THE INVENTION

1. Field of the Invention

The present invention relates to a data transmission/reception system and data transmission/reception method that transmits and receives data with a server outside a moving vehicle even when the moving vehicle is, for example, a train, an automobile, an aircraft, or a ship that is in motion.

2. Description of the Related Art

Document 1 below describes an information communication system in which an information terminal inside a vehicle can connect to a server on the Internet by way of a wireless communication network. In the information communication system that is described in Document 1, an on-board information communication system that is inside the vehicle, an access point such as a wireless LAN that is installed along the route, and a server are connected by way of the Internet.

Document 1: Japanese Patent Laid-Open Publication No. 2002-236632 In the information communication system that is described in Document 1, a user operates the terminal of the on-board information communication system to apply instructions for transmitting and receiving data. In accordance with the user's operations, the on-board information communication system transmits data that have been instructed by the user to the server by way of an access point or a telephone network and the Internet. The server transfers the data to the on-board information communication system by way of the access point or telephone network and the Internet. In the information communication system that is descried in Document 1, an on-board information communication system is able to transmit and receive data even in a moving environment by using either a route-side access point or a telephone network.

In Document 2 described below, a service-providing system is described that uses an on-board server that is installed inside a vehicle as a relay server to connect to a server on the Internet by way of the Internet and a wireless communication network that uses, for example, satellite communication.

Document 2: Japanese Patent Laid-Open Publication No. 2001-222603

In the service-providing system that is described in Document 2, an on-board terminal that is used by a user, an on-board server, an on-board wireless unit, and a transmitter-receiver are established in the vehicle. In addition, the on-board transmitter-receiver is connected to the transmitter-receiver of an information-providing system by way of a wireless communication network. The information-providing system is connected to the servers of, for example, various shops and restaurants by way of the Internet.

In the service-providing system that is described in Document 2, in accordance with the operations of the user, the on-board terminal uses the on-board server as a relay server to access the information-providing system by way of a wireless communication network. The user can then use various services of servers on the Internet while in a vehicle such as a moving train.

The information communication system that is described in Document 1 assumes a constant connection and a real-time connection, and this system is therefore not suited to the transmission and reception of data between a server that is outside the moving vehicle and a moving vehicle that is traveling at high speed, such as an aircraft, bullet train, or TGV, in which communication is easily interrupted. In addition, transmission and reception of data is not possible between a server that is outside a moving vehicle and a moving vehicle that is traveling in areas that cannot be reached by radio wave, such as a subway train or a ship. When a portable telephone network or PHS network is used to communicate with a server that is outside a moving vehicle, the data communication rate is limited and such a system is therefore not suitable for transmitting and receiving a large volume of data.

The service-providing system that is described in Document 2 also assumes a constant connection and is therefore not suited to the transmission and reception of data between a server that is outside a moving vehicle and from within a moving vehicle that is moving at high speed or a moving vehicle that is traveling in a location that cannot be reached by radio wave. For example, communication is not possible between a moving vehicle and the outside when the moving vehicle is traveling at high speed or when the moving vehicle has entered an area that cannot be reached by radio wave such as a tunnel, and the transmission and reception of data in accordance with a request from the on-board terminal therefore becomes impossible. In particular, when communication is interrupted during the transmission and reception of large volume of data, the data download or data upload process must be repeated from the start. In addition, the reliability of transmission and reception of data is low because the on-board server is merely a relay server, and this system is therefore not suited to the transmission and reception of important data.

SUMMARY OF THE INVENTION

It is an object of the present invention to provide a data transmission/reception system and data transmission/reception method that allows transmission and reception of data even from a moving vehicle in which a constant connection to a communication network is not possible.

The data transmission/reception system of the present invention is a data transmission/reception system in which a user terminal that is used by a user inside a moving vehicle transmits and receives data with a server that is outside the moving vehicle by way of a communication network; wherein an on-board server is established inside the moving vehicle, the on-board server being provided with: communication state determination means for determining whether a state that allows communication with the server that is outside the moving vehicle has been established; data transmission/reception means for carrying out transmission and reception of data with the server that is outside the moving vehicle by way of a communication network in accordance with a request from a user terminal when the communication state determination means has determined that a state has been established that allows communication with the server that is outside the moving vehicle; and data saving means for temporarily saving data that are transmitted and received by the data transmission/reception means.

In addition, the data saving means may temporarily save upload data that have been received from a user terminal; and when the communication state determination means has determined that a state has been established that allows communication with the upload destination that is outside the moving vehicle, the data transmission/reception means may transmit upload data that have been saved by the data saving means to the server that is the upload destination by way of a communication network in accordance with an upload request from the user terminal.

In addition, the data transmission/reception means may, when the transmission of upload data to the server that is the upload destination is interrupted during transmission, remain in a standby state until the communication state determination means determines that a state that allows communication with the server that is the upload destination has again been established; and re-transmit upload data to the server that is the upload destination by way of a communication network when the communication state determination means determines that a state that allows communication with the server that is the upload destination has again been established. According to this configuration, when communication is interrupted during data transmission, a server in a moving vehicle automatically retransmits data without requiring the user to carry out operations for a retransmission request. The burden upon the user to perform operations can therefore be eased.

In addition, the on-board server may be provided with a data deletion means for, when the data transmission/reception means has completed transmission of upload data to the server that is the upload destination, deleting the upload data that have been temporarily saved by the data saving means.

Further, the communication state determination means may determine whether a state is established that allows communication with the server that is the download destination and that is outside the moving vehicle; the data transmission/reception means may receive download data from the server that is the download destination by way of a communication network in accordance with a download request from a user terminal when the communication state determination means has determined that a state has been established that allows communication with the server that is the download destination; and the data saving means may temporarily save download data that have been received by the data transmission/reception means.

Still further, the data reception means may be a device that, when the reception of download data from the server that is the download destination is interrupted, remains in standby until the communication state determination means determines that a state that allows communication with the server that is the download destination has again been established, and that re-receives download data from the server that is the download destination by way of a communication network when the communication state determination means determines that a state that allows communication with the server that is the download destination has again been established. According to this configuration, when communication is interrupted during data reception, the on-board server automatically re-receives data without requiring the user to perform operations such as submitting another transmission request, and thus can lighten the burden on the user to perform operations.

The on-board server may be provided with: a data transfer means for transferring download data that are temporarily saved by the data saving means to a user terminal in accordance with a request from a user terminal; and a data deletion means for deleting download data that are temporarily held by the data saving means after the data transfer means has completed transfer of download data to the user terminal.

In the data transmission/reception system, moreover, relay servers for relaying the transmission and reception of data between the on-board server and the server that is outside the moving vehicle may be established at each relay point; and the relay servers may be provided with relay data saving means for temporarily saving the transmission and reception data of the on-board server and the server that is outside the moving vehicle. Such a configuration enables an increase in the reliability of data communication between an on-board server and a server that is outside the moving vehicle.

The data transmission/reception method according to the present invention is a data transmission/reception method in which a user terminal that is used by a user in a moving vehicle transmits and receives data with a server that is outside the moving vehicle by way of a communication network, the data transmission/reception method including steps of: determining whether a state is established that allows communication with the server outside the moving vehicle; transmitting and receiving data with the server that is outside the moving vehicle by way of a communication network in accordance with a request from the user terminal when it has been determined that a state has been established that allows communication with the server that is outside the moving vehicle; and temporarily saving data that are transmitted and received.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment

Figure 1:
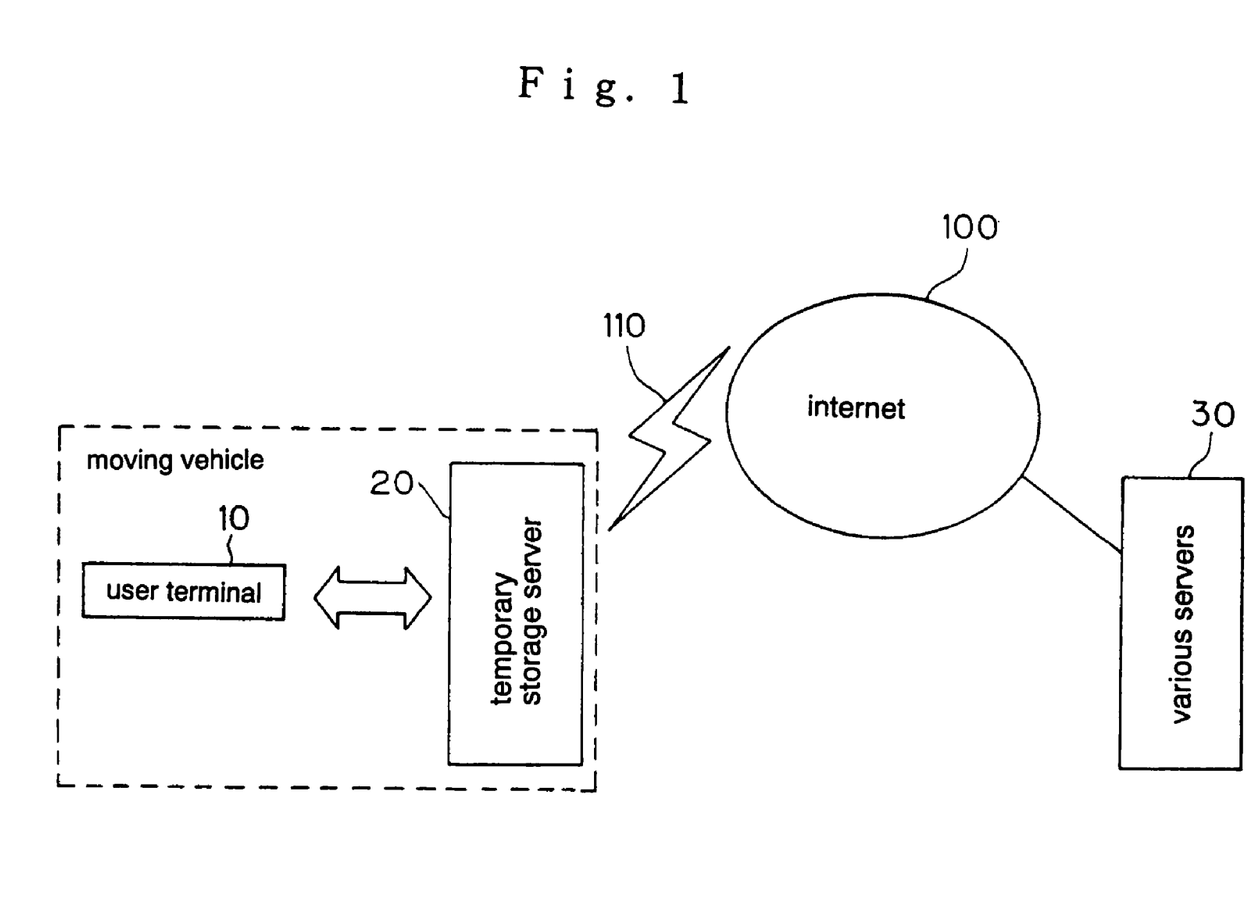
FIG. 1 is a block diagram showing the configuration of a data transmission/reception system according to the first embodiment of the present invention.

Explanation next regards the first embodiment of the present invention with reference to the accompanying drawings. FIG. 1 is a block diagram showing an example of the configuration of the data transmission/reception system according to the present invention. As shown in FIG. 1, the data transmission/reception system includes user terminal 10 that is used by a user, temporary storage server 20, and various servers 30.

As shown in FIG. 1, user terminal 10 is used inside a moving vehicle such as a train, an automobile, an aircraft, or a ship, and is connected wirelessly to temporary storage server 20 in the moving vehicle. In addition, temporary storage server 20 is established inside the moving vehicle and is connected to Internet 100 by way of a wireless communication network 110 such as a wireless LAN. Temporary storage server 20 transmits and receives data with various servers 30 by way of wireless communication network 110 and Internet 100. Further, in the present embodiment, the transmission and reception of data with various servers 30 by way of wireless communication network 110 and Internet 100 that is carried out by temporary storage server 20 is referred to simply as the transmission and reception of data by temporary storage server 20 with various servers 30 by way of a communication network.

User terminal 10 is a portable information processor such as a notebook computer, a portable telephone, or a PDA. A browser or mailer is installed in user terminal 10, and user terminal has the capability to connect to Internet 100. In the present embodiment, user terminal 10 accesses temporary storage server 20 in the moving vehicle and then connects to Internet 100 by way of temporary storage server 20.

User terminal 10 is provided with the capability to transmit to temporary storage server 20 requests to upload data and requests to download data to various servers 30 on Internet 100. In addition, user terminal 10 is provided with the capability to save data that have been downloaded or data that are to be uploaded.

In the present embodiment, in accordance with, for example, the operations of the user, user terminal 10 requests temporary storage server 20 for the transmission and reception of document data such as text, multimedia data that include moving pictures and speech, or mail data. In addition, user terminal 10, in accordance with, for example, the operations of the user, requests temporary storage server 20 for the download of software.

Although a single user terminal 10 is shown in the moving vehicle in FIG. 1, a plurality of user terminals 10 may be present in the moving vehicle.

Temporary storage server (on-board server) 20 is provided with the capability to temporarily save data. In the present embodiment, when an upload request is submitted from user terminal 10, temporary storage server 20 temporarily saves the upload data that have been received from user terminal 10. Alternatively, upon receiving a download request from user terminal 10, temporary storage server 20 temporarily saves the download data that have been received from various servers 30.

Temporary storage server 20 is further provided with the capability for data transmission and reception with various servers 30 by way of a communication network. In the present embodiment, temporary storage server 20 transmits upload data that have been temporarily saved to various servers 30 by way of the communication network. Alternatively, temporary storage server 20 receives from various servers 30 and by way of the communication network the download data that have been requested from user terminal 10.

Temporary storage server 20 is further provided with the capability to transmit and receive data with user terminal 10. In the present embodiment, temporary storage server 20 receives upload data from user terminal 10. Alternatively, temporary storage server 20 transmits download data that have been temporarily saved to user terminal 10.

Temporary storage server 20 is further provided with the capability to delete data that are temporarily saved upon completion of the transfer of data to user terminal 10 or various servers 30. In the present embodiment, upon completion of the transmission of upload data to various servers 30, temporary storage server 20 deletes the upload data that have been temporarily saved. Alternatively, upon completion of the transmission of download data to user terminal 10, temporary storage server 20 deletes the download data that have been temporarily saved.

Temporary storage server 20 is further provided with the capability to determine whether a state has been established that allows communication with various servers 30. In the present embodiment, temporary storage server 20 uses a network connection diagnostic method known as "ping" to determine the communication state with various servers 30. In the present embodiment, temporary storage server 20 transmits a ping command for each predetermined prescribed time interval to various servers 30 by way of the communication network. Temporary storage server 20 then determines whether a state has been established that allows communication with various servers 30 based on the response or lack of response from various servers 30 as well as the response time.

Temporary storage server 20 further enters a standby state while temporarily saving data if the communication state deteriorates and communication is interrupted during data transmission to various servers 30. Temporary storage server 20 is further provided with the capability to, upon recovery of the communication state with various servers 30, retransmit the temporarily saved data to various servers 30 by way of the communication network.

Alternatively, if the communication state deteriorates and communication is interrupted during reception of data from various servers 30, temporary storage server 20 enters a standby state until recovery of the communication state with various servers 30. Temporary storage server 20 is then provided with the capability to again receive the data from various servers 30 by way of the communication network upon recovery of the communication state with various servers 30.

More specifically, various servers 30 are, for example, file servers, mail servers, application servers, or database servers. Various servers 30 are provided with the capability to receive and save upload data from temporary storage server 20 by way of the communication network in accordance with requests for upload from temporary storage server 20. In addition, various servers 30 are provided with the capability to, in accordance with download requests from temporary storage server 20, extract download the data that have been requested, and transmit the download data that have been extracted to temporary storage server 20 by way of the communication network.

Various servers 30 are further provided with an authentication database for storing the authentication data of the users of each user terminal 10. Various servers 30 are further provided with the capability to authenticate whether a user is permitted to log in when a log-in request arrives from user terminal 10 by way of temporary storage server 20. In the present embodiment, the authentication database of various servers 30 stores in advance as the authentication data the log-in name of each user in correspondence passwords. In addition, various servers 30 authenticate users by collating the log-in names and passwords that are transferred from temporary storage server 20 with authentication data that are stored in the authentication database.

FIG. 1 shows one of various servers 30, but temporary storage server 20 is connected to a plurality of various servers 30 by way of the communication network. In addition, various servers 30 also cooperate in carrying out the process of authenticating users. In the present embodiment, various servers 30 store the same respective log-in names and the same passwords in an authentication database for the same users. A user can then log into various servers 30 by operating user terminal 10 to enter the common log-in name and password, regardless of the server that the user wishes to log into.

In addition, if log-in is possible to any of various servers 30, a user who wishes to log into various servers 30 other than various servers 30 that the user is currently logged into can then have the authentication transferred. For example, if a user, after being authenticated and logging into any of various servers 30, wishes to further log into various servers 30 other than the various servers 30 to which the user has already logged in, the user can log in without having to again enter the log-in name and password.

In the present embodiment, the communication state determination means, the data deletion means, and the data transfer means are realized by a control unit of temporary storage server 20 that operates in accordance with a program. The data transmission/reception means is realized by a control unit and a network interface unit of temporary storage server 20 that operates in accordance with a program. The data saving means is realized by the storage device of temporary storage server 20.

In the present embodiment, moreover, the storage unit of temporary storage server 20 stores various programs for executing the processes for relaying data transmission/reception between user terminal 10 and various servers 30. For example, the storage unit of temporary storage server 20 stores data transmitting/receiving programs for causing a computer to execute: processes for determining whether a state has been established that allows communication between the server outside the moving vehicle; processes for transmitting and receiving data with a server outside the moving vehicle by way of the communication network in accordance with requests from a user terminal when it has been determined that communication is possible with the server outside the moving vehicle; and processes for temporarily saving data that are transmitted and received.

Figure 2:
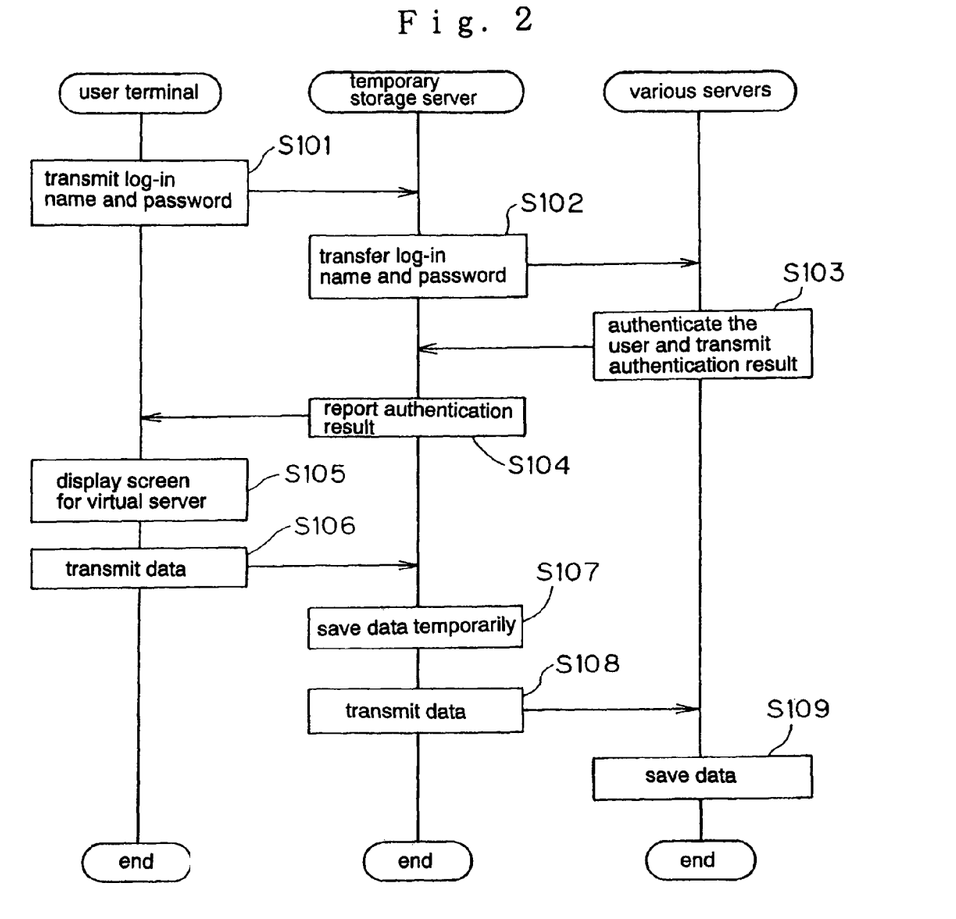
FIG. 2 is a flow chart showing an example of an uploading process in which temporary storage server 20 relays the upload of data to various servers 30 in accordance with a request from user terminal 10.

Explanation next regards operations. Explanation first regards a case in which temporary storage server 20 relays the uploading of data from user terminal 10 to various servers 30. FIG. 2 is a flow chart showing an example of the uploading process in which temporary storage server 20 relays the uploading of data to various servers 30 in accordance with a request from user terminal 10.

Figure 3:
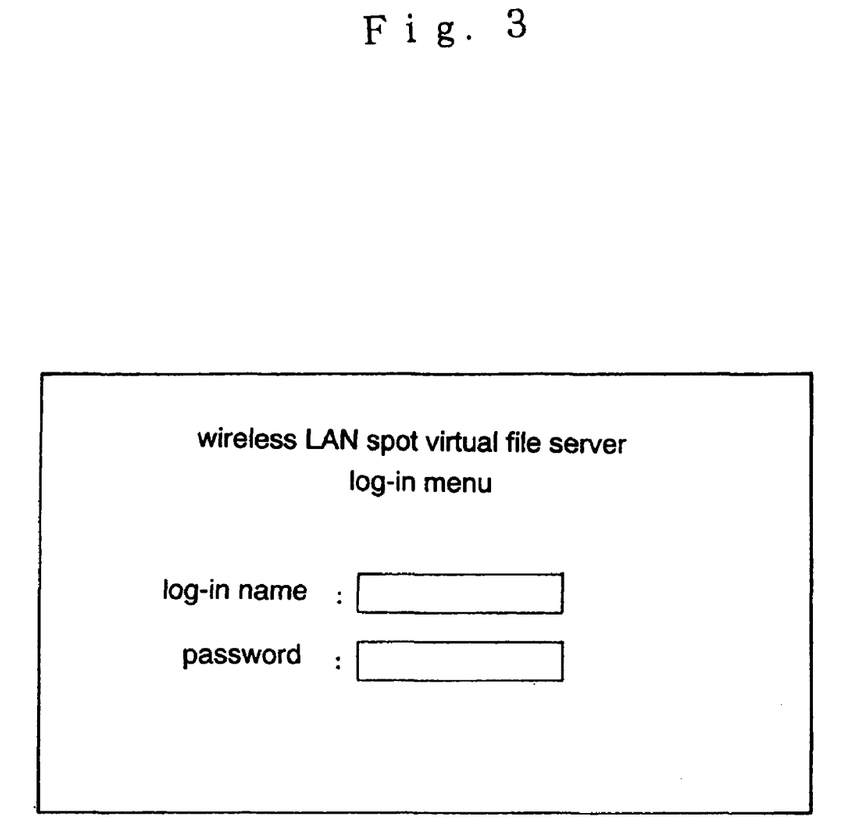
FIG. 3 shows an example of the log-in screen that is displayed by user terminal 10.

The user operates user terminal 10 inside a moving vehicle to enter a log-in name and password in order to log into temporary storage server 20 and various servers 30, and user terminal 10 then transmits the entered log-in name and password to temporary storage server 20 (step S101). For example, in accordance with the user's operation, user terminal 10 displays a log-in screen for logging into temporary storage server 20 and various servers 30. FIG. 3 is an explanatory view showing an example of a log-in screen that is displayed by user terminal 10. When the user enters a log-in name and password from the log-in screen that is shown in FIG. 3, user terminal 10 transmits the log-in name and password that have been entered to temporary storage server 20.

Temporary storage server 20 transfers the log-in name and password that have been received from user terminal 10 to various servers 30 by way of the communication network (step S102). Various servers 30 authenticates the user based on the log-in name and password that have been received from temporary storage server 20 and then transmits the authentication results to temporary storage server 20 by way of the communication network (step S103).

When the log-in name and password match with authentication data in step S103, various servers 30 permits log-in from user terminal 10. Various servers 30 then transmit the authentication results indicating that log-in is permitted to temporary storage server 20. Alternatively, if the log-in name and password do not match with authentication data, various servers 30 transmits authentication results indicating that log-in is not permitted to temporary storage server 20.

Upon receiving authentication results indicating that log-in is permitted, temporary storage server 20 permits log-in from user terminal 10. Temporary storage server 20 then transmits notification to user terminal 10 indicating that log-in is permitted (step S104). Upon receiving authentication results indicating that log-in is not permitted, temporary storage server 20 transmits a notification to user terminal 10 indicating that log-in is not permitted.

Upon completion of log-in to temporary storage server 20 and various servers 30 and receiving notification indicating that log-in is permitted, user terminal 10 displays a display screen for access with temporary storage server 20 as virtual various servers 30 (step S105). In the following explanation, the display screen for access that is displayed by user terminal 10 with temporary storage server 20 as virtual various servers 30 will be referred to as "virtual file server display screen."

Figure 4:
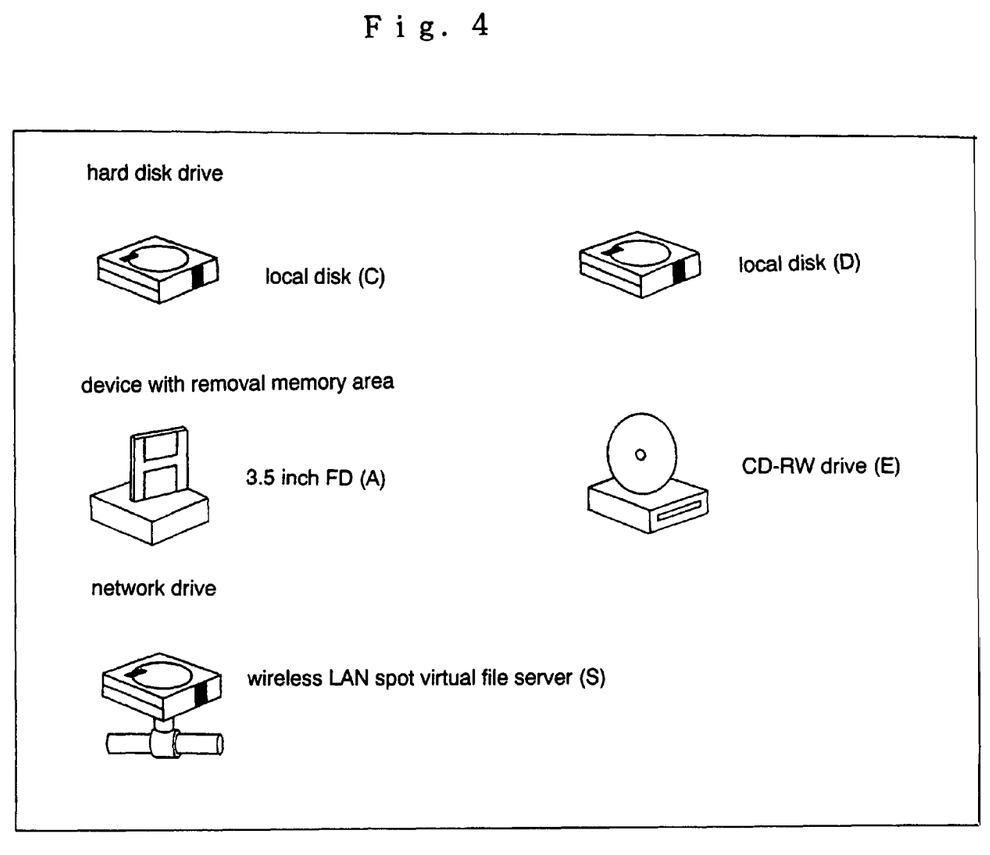
FIG. 4 shows an example of the virtual file server display screen.

FIG. 4 is an explanatory view showing an example of the virtual file server display screen. FIG. 4 is an example of a display screen for a case in which user terminal 10 uses Windows XP (registered trademark) as the operating system (OS). As shown in FIG. 4, upon receiving notification that log-in is permitted, user terminal 10 displays a display screen that includes an alias of the virtual file server. When the display screen that is shown in FIG. 4 is displayed, the user is enabled to operate user terminal 10 to request uploading to various servers 30.

In accordance with the operations of the user, user terminal 10 transmits upload request and upload data to temporary storage server 20 (step S106). Upon receiving the upload request and upload data, temporary storage server 20 temporarily saves the upload data that have been received (step S107).

When temporary storage server 20 is in a state that allows communication with various servers 30, temporary storage server 20 transmits the temporarily saved upload data to various servers 30 by way of the communication network (step S108).

When not in a state that allows communication with various servers 30 in step S108, temporary storage server 20 enters a standby state while continuing to temporarily save the upload data. Then, after a state is established that allows communication with various servers 30, temporary storage server 20 transmits the temporarily saved upload data to various servers 30 by way of the communication network. Upon completing transmission of upload data to various servers 30, temporary storage server 20 deletes the temporarily saved upload data.

If the communication state with various servers 30 deteriorates and communication is interrupted in the middle of data transmission in step S108, temporary storage server 20 enters a standby state while continuing to temporarily save the upload data. Then, upon recovery of the communication state with various servers 30, temporary storage server 20 retransmits the temporarily saved upload data to various servers 30 by way of the communication network.

Figure 5:
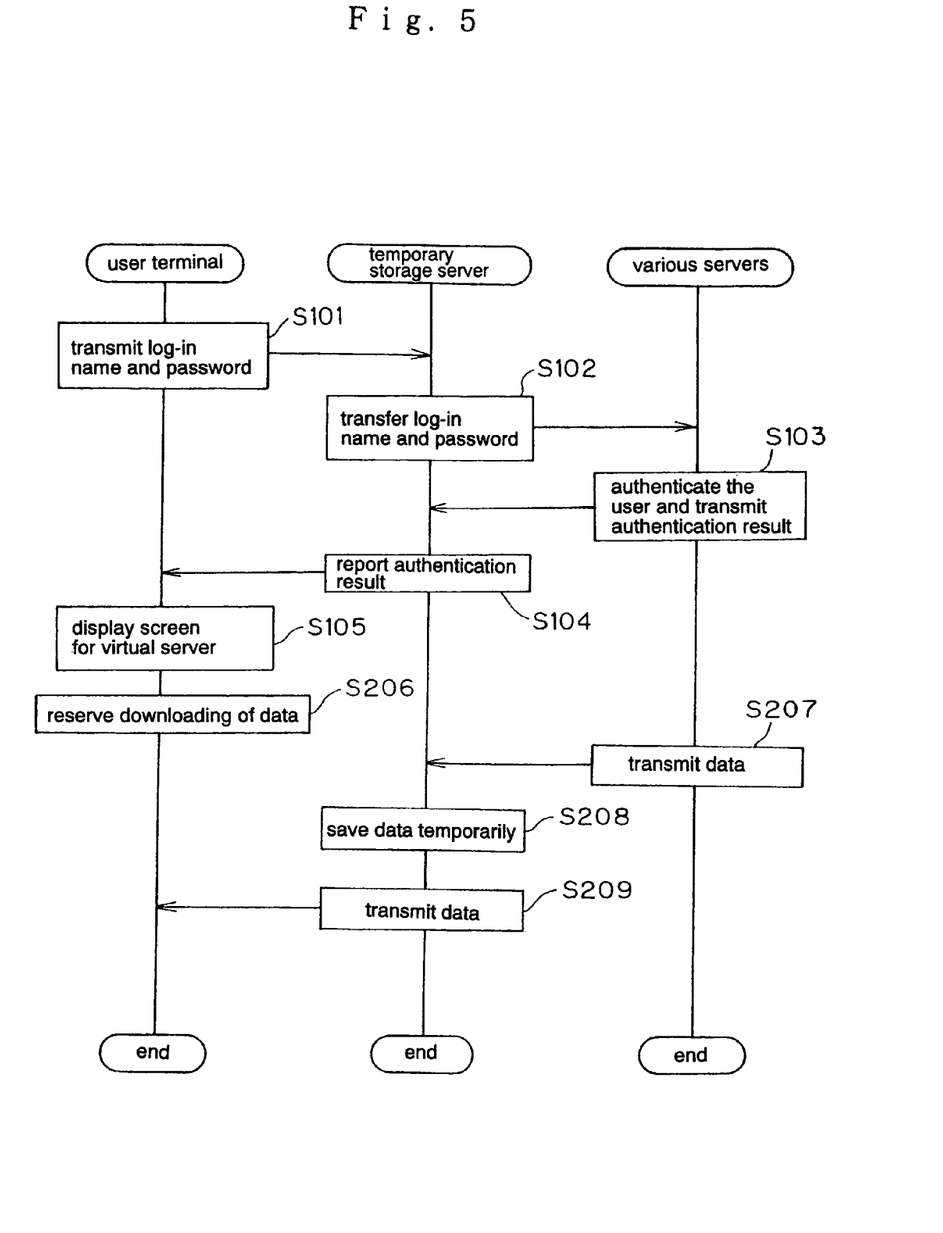
FIG. 5 is a flow chart showing an example of the download process in which temporary storage server 20 relays the data download from various servers 30 in accordance with a request from user terminal 10.

Various servers 30 then save the upload data that have been received from temporary storage server 20 (step S109). Explanation next regards a case in which temporary storage server 20 relays downloading of data from various servers 30 to user terminal 10. FIG. 5 is a flow chart showing an example of the download process in which temporary storage server 20 relays the downloading of data from various servers 30 in accordance with a request from user terminal 10.

In FIG. 5, the processes from step S101 to step S105 are similar to the respective processes in the upload process that is shown in FIG. 2. When the virtual file server display screen that is shown in FIG. 4 is displayed in step S105, the user is able to operate user terminal 10 to request download from various servers 30.

In accordance with the operations of the user, user terminal 10 transmits the download request to temporary storage server 20, and reserves the downloading of data (step S206).

If temporary storage server 20 is in a state that allows communication with various servers 30 upon receiving the download request, temporary storage server 20 transmits the request for data download that has been requested from user terminal 10 to various servers 30 by way of the communication network. Various servers 30 then extract the download data that have been requested and transmit the download data that have been extracted to temporary storage server 20 by way of the communication network (step S207).

When not in a state that allows communication with various servers 30 in step S207, temporary storage server 20 enters a standby state until a state that allows communication with various servers 30 is established, after which temporary storage server 20 transmits the download request to various servers 30 by way of the communication network.

If the communication state with various servers 30 deteriorates and communication is interrupted during data reception in step S207, temporary storage server 20 enters a standby state until recovery of the communication state with various servers 30, following which temporary storage server 20 again receives the download data from various servers 30 by way of the communication network.

Temporary storage server 20 then temporarily saves the download data that have been received from various servers 30 (step S208).

If the user wishes to acquire the reserved download data after passage of a fixed time interval, the user operates user terminal 10 to access temporary storage server 20 and enters instructions for a transfer request of the data that are temporarily saved by temporary storage server 20. In accordance with the user's operations, user terminal 10 transmits the transfer request for the data to temporary storage server 20.

Upon receiving the transfer request for the data, temporary storage server 20 transmits the temporarily saved download data to user terminal 10 (step S209). When the transmission of the download data to user terminal 10 has been completed, temporary storage server 20 deletes the download data that have been temporarily saved.

As described above, according to the present embodiment, data that have been requested in advance by using user terminal 10 are temporarily saved in temporary storage server 20 in a moving vehicle. When it is determined that temporary storage server 20 in the moving vehicle is in a state that allows communication with a server that is outside the moving vehicle, temporary storage server 20 automatically transmits and receives data with various servers 30 on Internet 100. Temporary storage server 20 establishes synchronization with various servers 30 and automatically transmits and receives the temporarily saved data and therefore is able to transmit and receive data even when a constant connection cannot be maintained with various servers 30 that are outside the moving vehicle. Accordingly, data can be transmitted and received even from within a moving vehicle in which a constant connection cannot be maintained with the communication network.

In particular, when uploading or downloading a large volume of data or electronic mail with various servers 30 on a network such as the Internet, the large volume of data can be transmitted and received even under circumstances in which a constant connection cannot be maintained with the communication network such as the Internet.

When communication is interrupted during data transfer because the moving vehicle is moving at high speed, the present embodiment causes temporary storage server 20 inside the moving vehicle to automatically retransmit or re-receive the data without requiring the user to perform operations such as submitting a request to retransmit. The present embodiment can therefore lighten the burden placed on the user to carry out operations. In the present embodiment, moreover, data are transmitted and received by using a wireless communication network such as a wireless LAN, and data can therefore be transmitted and received at higher rates than cases in which a portable telephone network or PHS network is used.

Second Embodiment

Figure 6:
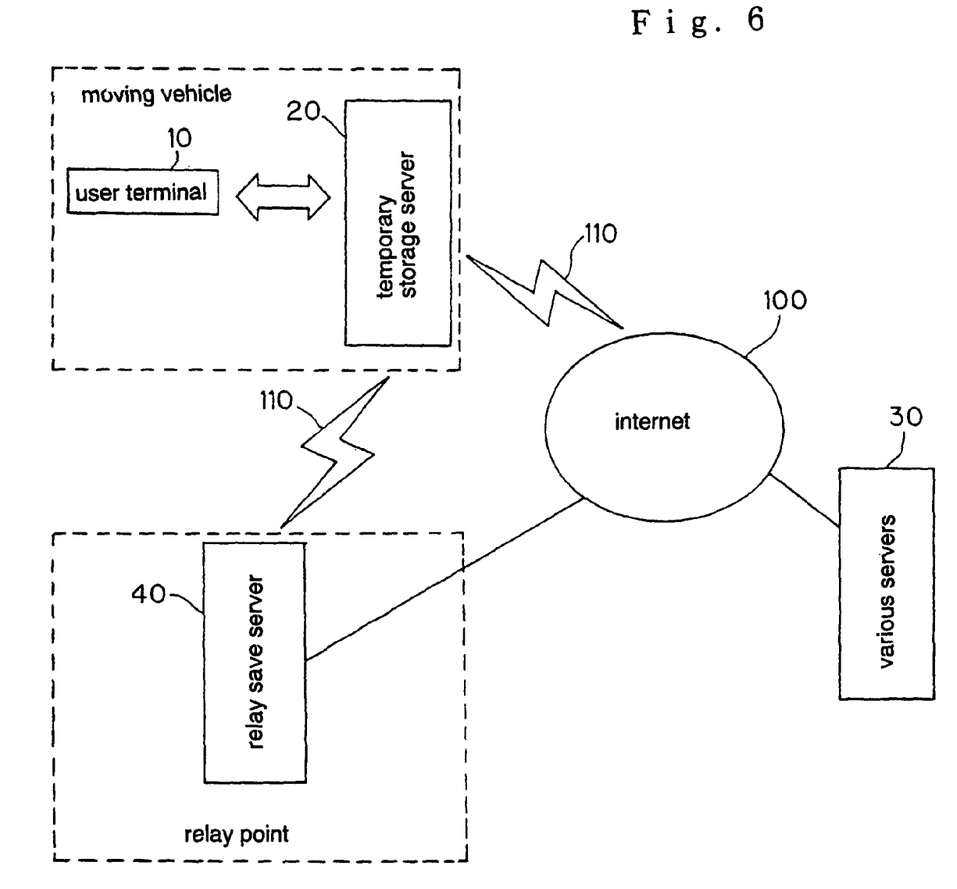
FIG. 6 is a block diagram showing another example of the configuration of a data transmission/reception system.

Explanation next regards the second embodiment of the present invention with reference to the accompanying drawings. FIG. 6 is a block diagram showing another example of the configuration of a data transmission/reception system. As shown in FIG. 6, the data transmission/reception system in the present embodiment includes relay save server 40 in addition to the configuration that was shown in the first embodiment. In the present embodiment, the transmission and reception of data between temporary storage server 20 and various servers 30 is relayed by relay save server 40.

Relay save servers 40 are established at each of relay points that are connected to wireless communication network 110 such as a wireless LAN. For example, relay save servers 40 are established in parking areas of superhighways, at stations, airports, and ports, and on islands. Although only one relay save server 40 is shown in FIG. 6, relay save servers 40 may exist at each relay point.

Relay save server (relay server) 40 is provided with the capability to temporarily save data. In the present embodiment, relay save server 40 temporarily saves upload data that have been received from temporary storage server 20. Relay save server 40 also temporarily saves download data that have been received from various servers 30.

Relay save server 40 is provided with the capability for data transmission and reception with various servers 30 by way of Internet 100. In the present embodiment, relay save server 40 transmits upload data that it temporarily saves to various servers 30 by way of Internet 100. Relay save server 40 further receives download data from various servers 30 by way of Internet 100.

Relay save server 40 is further provided with the capability to transmit and receive data with temporary storage server 20 by way of wireless communication network 110. In the present embodiment, relay save server 40 receives upload data from temporary storage server 20 by way of wireless communication network 110. Relay save server 40 further transmits download data that it temporarily saves to temporary storage server 20 by way of wireless communication network 110.

Relay save server 40 further has the capability to delete data that it has temporarily saved upon completion of data transfer to temporary storage server 20 or various servers 30. In the present embodiment, relay save server 40 deletes the upload data that it has temporarily saved upon completion of transmission of the upload data to various servers 30. Relay save server 40 further deletes download data that it has temporarily saved upon completion of transmission of the download data to temporary storage server 20.

In the present embodiment, the relay data saving means is realized by a storage device of relay save server 40.

Figure 7:
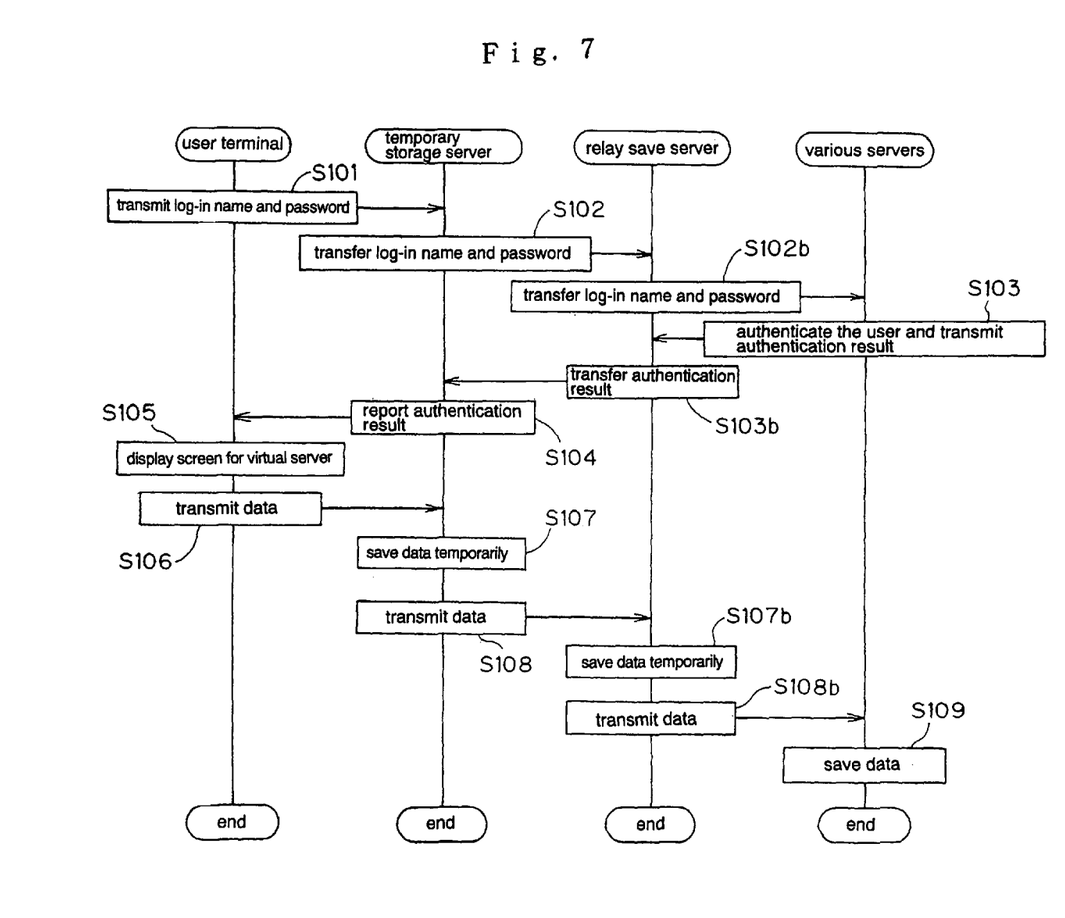
FIG. 7 is a flow chart showing another example of the upload process.

Explanation next regards operations. FIG. 7 is a flow chart showing another example of the upload process. In FIG. 7, the process of step S101 is similar to the process shown in the first embodiment. Temporary storage server 20 transfers the log-in name and password that have been received from user terminal 10 to relay save server 40 by way of wireless communication network 110 (step S102). Relay save server 40 then transfers the received log-in name and password to each of various servers 30 by way of Internet 100 (step S102b).

Upon executing the authentication process, various servers 30 transmit the authentication results to relay save server 40 by way of Internet 100 (step S103), and relay save server 40 then transfers the received authentication results to temporary storage server 20 by way of wireless communication network 110 (step S103b).

The processes from step S104 to step S107 are similar to the processes shown in the first embodiment. Temporary storage server 20 transmits the upload data that it has temporarily saved to relay save server 40 by way of wireless communication network 110 (step S108), whereupon relay save server 40 temporarily saves the received upload data (step S107b) and transmits the data that it has temporarily saved to various servers 30 by way of Internet 100 (step S108b). When transmission of the upload data to various servers 30 has been completed, relay save server 40 deletes the data that it has temporarily saved.

Various servers 30 then save the upload data that have been received from relay save server 40 (step S109).

Figure 8:
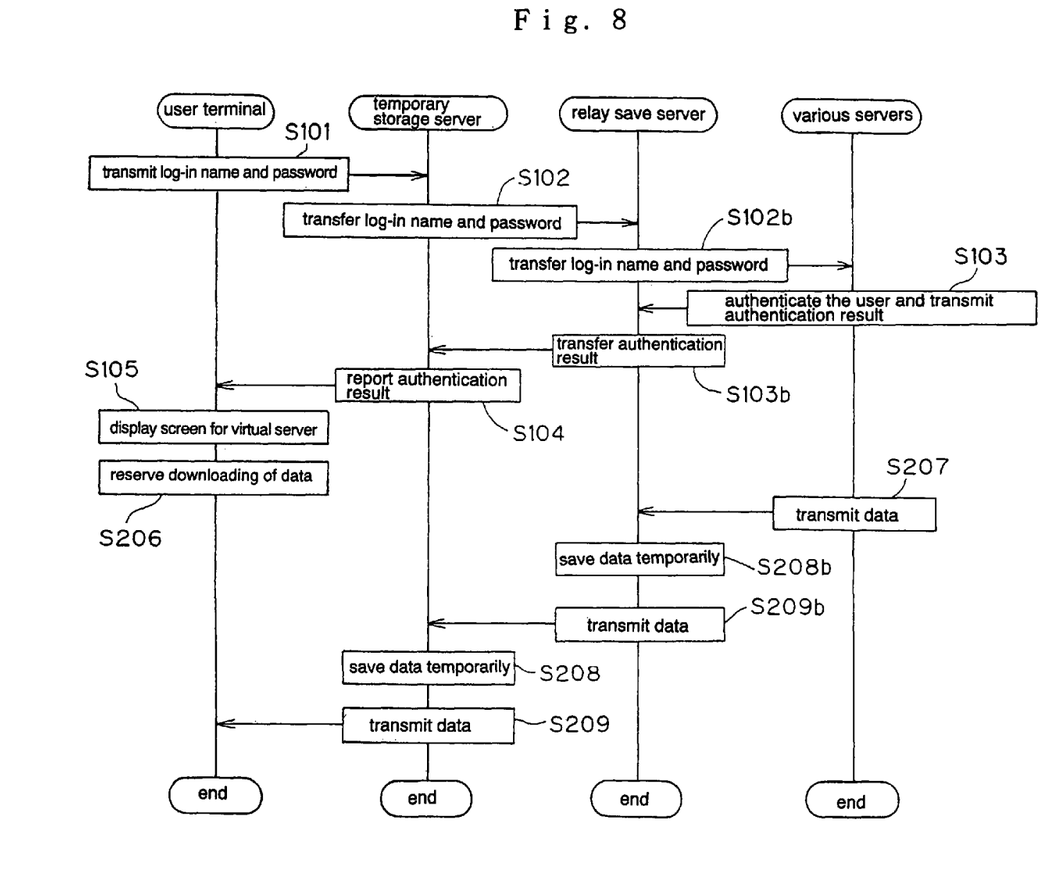
FIG. 8 is a flow chart showing another example of the download process.

FIG. 8 is a flow chart showing another example of the download process. In FIG. 8, the processes from step S101 to step S105 are similar to the respective processes in the upload processes shown in FIG. 7. In addition, the process of step S206 is similar to the process of step S206 in the first embodiment.

When temporary storage server 20 receives a download request from user terminal 10, temporary storage server 20 transmits the request for download of data that has been requested to relay save server 40 by way of wireless communication network 110, and relay save server 40 then transmits the request for download of data that has been requested from user terminal 10 to various servers 30 by way of Internet 100.

Various servers 30 extract the download data that have been requested and transmit the extracted download data to relay save server 40 by way of Internet 100 (step S207), whereupon relay save server 40 temporarily saves the download data that have been received (step S208b) and then transmits the temporarily saved data to temporary storage server 20 by way of wireless communication network 110 (step S209b). When the transmission of the download data to temporary storage server 20 has been completed, relay save server 40 deletes the temporarily saved download data.

The processes of step S208 and step S209 are similar to the respective processes in the first embodiment.

As described in the foregoing explanation, in the present embodiment, temporary storage server 20 requests various servers 30 for the upload or download of data by way of relay save server 40. In addition, relay save server 40 both relays the transmission and reception of data between temporary storage server 20 and various servers 30 and temporarily saves the relayed data. Thus, if relay save server 40 completes temporary saving of the download data, the downloading process can be continued even should Internet 100 become congested and the communication state deteriorate during download. Further, if relay save server 40 completes the temporary saving of upload data, the upload process can be continued even should communication between temporary storage server 20 and relay save server 40 be interrupted during upload.

Accordingly, the use of relay save server 40 of each relay point to relay the transmission and reception of data enables an increase in the reliability of data communication between temporary storage server 20 and various servers 30.

The present invention can be applied to the transmission and reception of data from moving vehicles such as trains, automobiles, aircraft, and ships to servers that are outside the moving vehicles. In particular, the present invention enables the transmission and reception of data even from within moving vehicles in which a constant connection to a communication network cannot be maintained, including moving vehicles that travel at high speed such as aircraft and bullet trains, and moving vehicles that travel in locations that cannot be reached by radio wave such as subway trains and ships.

While preferred embodiments of the present invention have been described using specific terms, such description is for illustrative purposes only, and it is to be understood that changes and variations may be made without departing from the spirit or scope of the following claims.

What is claimed is:

1. A data transmission/reception system comprising:
    a user terminal, that is used by a user inside a moving vehicle, which transmits data to and receives data from an outside server that is outside the moving vehicle, by way of a communication network; and
    an on-board server established inside said moving vehicle, wherein said on-board server comprises:
    a communication state determination means for determining whether said on-board server is in a state that allows communication with said outside server that is outside the moving vehicle;
    data saving means for temporarily saving said data transmitted and received by said user terminal that is used by a user inside said moving vehicle, said user terminal transmits to and receives data from said outside server, by way of a communication network; said on-board server configured to include a standby state for continuing to temporarily save said data when said communication state determination means determines that said outside server is in a state that does not allow communication,
    wherein said data are temporarily saved regardless of said state determined by said communication state determination means; and
    a data transmission/reception means for carrying out transmission and reception of said data temporarily saved by said data saving means by way of the communication network, when said communication state determination means determines that said data transmission/reception means is in a state that allows communication with said outside server, and when transmission or reception of said data with said outside server is interrupted, said data transmission/reception means stops transmitting or receiving said data while continuing to store said data until said communication state determination means re-determines that said data transmission/reception means is in a state that allows communication with said outside server.

2. A data transmission/reception system according to claim 1, wherein said data saving means temporarily saves upload data that have been received from said user terminal; and when said communication state determination means has determined that a state has been established that allows communication with an upload destination server that is outside the moving vehicle, said data transmission/reception means transmits upload data that have been saved by said data saving means to said server that is the upload destination by way of a communication network in accordance with an upload request from said user terminal.

3. A data transmission/reception system according to claim 2, wherein when the transmission of upload data to said server that is the upload destination is interrupted during transmission, said data transmission/reception means enters a standby state until said communication state determination means determines that a state that allows communication with said server that is the upload destination has again been established, and when said communication state determination means determines that a state that allows communication with said server that is the upload destination has again been established, re-transmits upload data to said server that is the upload destination by way of the communication network.

4. A data transmission/reception system according to claim 2, further comprising,
said on-board server is further provided with data deletion means for deleting upload data that have been temporarily saved by said data saving means when said data transmission/reception means has completed transmission of upload data to said server that is the upload destination.

5. A data transmission/reception system according to claim 3, further comprising:
said on-board server is further provided with data deletion means for deleting upload data that have been temporarily saved by said data saving means when said data transmission/reception means has completed transmission of upload data to said server that is the upload destination.

6. A data transmission/reception system according to claim 1, wherein said communication state determination means determines whether a state is established that allows communication with a server that is the download destination and that is outside the moving vehicle; said data transmission/reception means receives download data from said server that is the download destination by way of a communication network in accordance with a download request from a user terminal when said communication state determination means determines that a state has been established that allows communication with the server that is said download destination; and said data saving means temporarily saves download data that have been received by said data transmission/reception means.

7. A data transmission/reception system according to claim 6, wherein said data reception means: when the reception of download data from said server that is the download destination is interrupted during reception, remains in a standby state until said communication state determination means determines that a state that allows communication with said server that is the download destination has again been established; and when said communication state determination means determines that a state that allows communication with said server that is the download destination has again been established, re-receives download data from said server that is the download destination by way of a communication network.

8. A data transmission/reception system according to claim 6, wherein said on-board server is further provided with: a data transfer means for, in accordance with a request from a user terminal, transferring download data that are temporarily saved by said data saving means to said user terminal; and a data deletion means for, when said data transfer means completes transfer of download data to said user terminal, deleting download data that are temporarily held by said data saving means.

9. A data transmission/reception system according to claim 7, wherein said on-board server is further provided with: a data transfer means for, in accordance with a request from a user terminal, transferring download data that are temporarily saved by said data saving means to said user terminal; and a data deletion means for, when said data transfer means completes transfer of download data to said user terminal, deleting download data that are temporarily held by said data saving means.

10. A data transmission/reception method comprising:
transmitting and receiving data by a user terminal, that is used by user in a moving vehicle, with an outside server that is outside the moving vehicle by way of a communication network,
wherein the transmitting and receiving data comprises the steps of:
determining whether a state is established that allows communication with the outside server that is outside said moving vehicle and an on-board server established inside said moving vehicle;
temporarily saving said data that are transmitted and received by said user terminal with said outside server, which is configured to include a standby state for continuing to temporarily save said data when said communication state determination means determines that said outside server is in a state that does not allow communication,
wherein said data are temporarily saved regardless of said determined state; and
transmitting and receiving said temporarily saved data between said outside server that is outside said moving vehicle and said on-board server established inside said moving vehicle, by way of the communication network when it has been determined that a state has been established that allows communication with said outside server that is outside said moving vehicle and when transmission or reception of said data with said outside server is interrupted, said data transmission/reception means stops transmitting or receiving said data while continuing to store said data until said communication state determination means re-determines that said data transmission/reception means is in a state that allows communication with said outside server.

11. A non-transitory computer readable medium, including a data transmission/reception program, wherein the program, when executed by a processor, causes the processor to execute the steps, comprising:
transmitting and receiving data by a user terminal, that is used by user in a moving vehicle, with an outside server that is outside the moving vehicle by way of a communication network,
said data transmission/reception program causing a computer to execute the steps of
determining whether a state is established that allows communication with the outside server that is outside said moving vehicle and an on-board server established inside said moving vehicle; which is configured to include a standby state for continuing to temporarily save said data when said communication state determination means determines that said outside server is in a state that does not allow communication,
temporarily saving said data that are transmitted and received by said user terminal with said outside server,
wherein said data are temporarily saved regardless of said determined state; and
transmitting and receiving said temporarily saved data between said outside server that is outside said moving vehicle and said on-board server established inside said moving vehicle, by way of the communication network when it has been determined that a state has been established that allows communication with said outside server that is outside said moving vehicle and when transmission or reception of said data with said outside server is interrupted, said data transmission/reception means stops transmitting or receiving said data while continuing to store said data until said communication state determination means re-determines that said data transmission/reception means is in a state that allows communication with said outside server.

12. The data transmission/reception system according to claim 1, wherein if the communication state determination means determines that said on-board server is in a state that disallows communication with said outside server that is outside the moving vehicle, and the data transmission/reception means is in mid-transmission/reception of said temporarily saved data, said temporarily saved data is retransmitted/re-received when said communication state determination means determines that said on-board server is in a state that allows communication with said outside server that is outside the moving vehicle.

13. A data transmission/reception system comprising:
a user terminal that is used by a user inside a moving vehicle, which transmits to and receives data from an outside server that is outside the moving vehicle, by way of a communication network; and
an on-board server established inside said moving vehicle, wherein said on-board server comprises: a communication state determination unit for determining whether said on-board server is in a state that allows communication with said outside server that is outside of the moving vehicle;
a data saving unit for temporarily saving said data transmitted and received by a user terminal that is used by a user inside said moving vehicle, said user terminal transmits to and receives data from said outside server, by way of a communication network;
said on-board server configured to include a standby state for continuing to temporarily save said data when said communication state determination determines that said outside server is in a state that does not allow communication,
wherein said data is temporarily saved regardless of the state determined by said communication state determination unit; and
a data transmission/reception unit for carrying out transmission and reception of said data temporarily saved by said data saving unit by way of the communication network, when said communication state determination unit determines that said data transmission/reception unit is in a state that allows communication with said outside server, and when transmission or reception of said data with said outside server is interrupted, said data transmission/reception unit stops transmitting or receiving said data while continuing to store said data until said communication state determination unit re-determines that said data transmission/reception unit is in a state that allows communication with said outside server.

* * * * *